United States Patent [19]
Enomoto

[11] Patent Number: 5,735,174
[45] Date of Patent: Apr. 7, 1998

[54] BEARING, FEMALE SCREW, LINEARLY MOVING BLOCK, LINEARLY MOVING BLOCK UNIT, AND GUIDE RAIL

[76] Inventor: Nobuo Enomoto, Uenohara 1835, Uenohara-machi, Kita-tsuru-gun, Yamanashi-ken, 409-01, Japan

[21] Appl. No.: 535,153

[22] PCT Filed: Mar. 10, 1995

[86] PCT No.: PCT/JP95/00397

§ 371 Date: Mar. 21, 1996

§ 102(e) Date: Mar. 21, 1996

[87] PCT Pub. No.: WO95/24570

PCT Pub. Date: Sep. 14, 1995

[30] Foreign Application Priority Data

| Mar. 10, 1994 | [JP] | Japan | 6-066783 |
| Jun. 16, 1994 | [JP] | Japan | 6-157904 |
| Jun. 23, 1994 | [JP] | Japan | 6-164718 |

[51] Int. Cl.⁶ .................................................... F16C 29/04
[52] U.S. Cl. ................................................... 74/89.15
[58] Field of Search ....................... 384/45, 13, 454, 384/7.47; 74/459, 89.15

[56] References Cited

U.S. PATENT DOCUMENTS

| 5,074,160 | 12/1991 | Kasuga | 384/45 |
| 5,302,032 | 4/1994 | Niwa et al. | 384/454 |
| 5,454,278 | 10/1995 | Kasuga | 384/13 |

*Primary Examiner*—Lenard A. Footland
*Attorney, Agent, or Firm*—Baker & Botts, L.L.P.

[57] ABSTRACT

The present invention relates to a bearing for moving a cylindrical rod shaped guide member, a female screw (such as a spline nut), a guide rail, and a linearly moving block for moving on the guide rail, and a linearly moving block unit having a ball screw shaft rotatably pivoted and an angular nut that fits into the ball screw shaft. A carbon fiber dispersed resin is disposed at a contacting portion and a sliding portion. A smooth sliding operation can be accomplished without need to use a ball bearing or the like almost free of a play and noise. In addition, slide portions are prevented from getting worn and damaged. Moreover, the cost of the embodiment of the present invention is relatively low.

1 Claim, 7 Drawing Sheets

BEARING, FEMALE SCREW, LINEARLY MOVING BLOCK, LINEARLY MOVING BLOCK UNIT, AND GUIDE RAIL

TECHNICAL FIELD

First to sixth aspects of the present invention relate to a cylindrical pipe shaped bearing or a nearly-cylindrical pipe shaped bearing for linearly moving along a cylindrical rod shaped guide member or a nearly-cylindrical rod shaped guide member. The present invention includes a rotating motion of the bearing in the peripheral direction of the guide member. Thus, the bearing according to the present invention can actively used for a rotating motion. Alternatively, the bearing can be inevitably used for a rotating motion.

Examples of the guide member or the guide are rod shaped guide members for use with dies (such as a guide post, a sub-guide post, and a guide pin), that are used in a punching process, a bending process, a drawing process, a forging process, an injection molding process, a die casting process, a powder molding process, and so forth. Other examples are cramp shafts used in an injection molding machine and a molding machine and a guide shaft used in a press machine. Further examples are spline shafts using in an instrumenting machine, a medical machine, a scientific machine, an optical machine, a copy machine, and a printer.

The "bearing" is also referred to as a bush.

A seventh aspect of the present invention relates to a female screw that fits into a male screw. Examples of the male screw are a nut and spline nut. The spline nut is fitted into a feed screw shaft.

Eighth to eleventh aspects of the present invention relate to a linearly moving block for moving on a guide rail.

Twelfth to fourteenth aspects of the present invention relate to a guide rail for guiding a linearly moving block.

A fifteenth aspect of the present invention relates to a linearly moving block unit having a ball screw shaft rotatably pivoted and an angular nut that fits into the ball screw shaft.

RELATED ART

In the technical field of the first to sixth aspects of the present invention, metal bushes and ball retainers have been widely used as related art references.

In the technical field of the seventh aspect of the present invention, metal female screws having inner threads formed by a machining process have been used.

First Problem

A metal bush has a large frictional resistance. When the metal bush is moved, a large force is required. In addition, the metal bush tends to get scuffed and baked. Moreover, the metal bush tends to wear out, resulting in a play.

The ball retainer uses a ball bearing that has balls that point contact a moving portion. Thus, even if the number of balls of the ball bearing is increased, the total contacting area is still small. Consequently, a large pressure is applied to the ball bearing, thereby causing a guide member to be linearly scratched. Since the ball bearing is used, it may be out of lubrication. In addition, frictional heat may take place. In more extreme case, the ball bearing may get baked. Moreover, since the balls of ball retainer point contact the guide member, the ball retainer tends to have a play, thereby deteriorating the dimensional accuracy. Since the degree of freedom of the ball retainer is too large, it is difficult to adjust it. Since the frictional resistance of the conventional retainer is large, a large force is required to perform a sliding motion of a die set. Moreover, since the balls of the ball bearing are disposed in a diagonal direction, the relative motion of the guide post and the retainer tends to be performed in the diagonal direction. As a result, the motion of the bearing becomes a spiral motion including a rotating motion rather than a true linear motion. Thus, an undesired lateral force is applied to a punching cutter or the like of a die. Consequently, the cutter tends to get damaged or partially worn out.

Second Problem

Since the conventional female screw and the spline nut are composed of a metal and machine processed, they are expensive and tend to get scuffed. When the female screw and the spline nut use ball bearings, the cost thereof more increases.

In the technical field of the twelfth to fourteenth aspects of the present invention, a conventional guide rail is composed of stainless steel or the like. An R-groove or the like for the ball bearing extends in the longitudinal direction on an inner side surface of the guide rail.

In the technical field of the eighth to eleventh aspects of the present invention, a conventional linearly moving block is formed of a horizontal plate and two side plates connected to both edges of the horizontal plate in such a manner that the side plates are perpendicular to the horizontal plate. Thus, the cross-section of the conventional linearly moving block is formed in a "⊓" shape. On the left and right side plates, ball rolling grooves for holding balls of ball bearings and for allowing them to roll are formed. In the left and right side plates and in the vicinity of the ball rolling grooves, ball return paths are formed. The balls of the ball bearings are circulated through the ball return paths. Conventionally, in each of the left and right side plates, two ball paths are formed.

Since the linearly moving block is disposed on the guide rail, the balls of the ball bearings of the linearly moving block are in contact with the ball rolling grooves of the guide rail so as to support the load applied to the linearly moving block.

Third Problem

However, in the conventional guide rail and the conventional linearly moving block, the load applied to the linearly moving block that is a force working in the vertical direction is applied to the ball bearings and the ball rolling grooves. Thus, the rigidity of the guide rail becomes insufficient. In addition, the ball rolling grooves tend to get dented on linearly scratched. Consequently, since the linearly moving block cannot be smoothly moved, the guide rail should be replaced.

Fourth Problem

In the technical field of the fifteenth aspect of the present invention, balls of ball bearings move along spiral grooves formed in inner surfaces of an angular nut. In addition return paths for circulating balls of ball bearings are formed in the angular nut. When the ball screw shaft is rotated, the balls of the ball bearings are rotated while they are in contact with the threads of the ball screw shaft and the spiral grooves of the angular nut. Thus, the angular nut is moved in the longitudinal direction of the ball screw shaft.

However, since the conventional linearly moving block has the return paths and the spiral grooves for moving balls of ball bearings, it is expensive. In addition, the linearly moving block generates large noise and large vibration. Moreover, the ball bearings tend to wear out.

DISCLOSURE OF THE INVENTION

The first problem can be solved by the first aspect of the present invention that is a cylindrical pipe shaped bearing for linearly moving along a cylindrical rod shaped guide member, the bearing having a carbon fiber dispersed resin layer disposed on the inner surface of the bearing.

The first problem can be solved by the second aspect of the present invention that is a nearly cylindrical pipe shaped bearing for linearly moving along a nearly cylindrical rod shaped guide member having a plane that extends in parallel with the center axis of the guide member, the bearing having a plane that extends in parallel with the center shaft of the bearing and a carbon fiber dispersed resin layer disposed on the inner surface of the bearing.

In the preferred embodiments of the first and second aspects of the present invention, the bearing has a peripheral groove in the inner surface thereof, the area of the peripheral groove outwardly increasing, a carbon fiber dispersed resin being filled in the peripheral groove, the inner surface of the bearing being coated with the carbon fiber dispersed resin.

The first problem can be solved by the third aspect of the present invention that is a cylindrical pipe shaped bearing for linearly moving along a cylindrical rod shaped guide member, the bearing having a carbon fiber dispersed resin coated layer disposed on the inner surface in the vicinity of an entrance and an exit of the bearing.

The first problem can be solved by the fourth aspect of the present invention that is a nearly cylindrical pipe shaped bearing for linearly moving along a nearly cylindrical rod shaped guide member having a continuous grove, the groove extending in parallel with the guide member, the bearing having a protrusion that extend in parallel with the center axis of the bearing, the protrusion being composed of a carbon fiber dispersed resin.

The first problem can be solved by the fifth aspect of the present invention that is a cylindrical pipe shaped bearing for linearly moving along a cylindrical rod shaped guide member, the bearing having a silicon rubber coated layer disposed on the inner surface in the vicinity of an entrance and an exit of the bearing.

The first problem can be solved by the sixth aspect of the present invention that is a nearly cylindrical pipe shaped bearing for linearly moving along a nearly cylindrical rod shaped guide member having a continuous grove, the groove extending in parallel with the guide member, the bearing having a protrusion that extend in parallel with the center axis of the bearing, the protrusion being composed of a silicon rubber.

The second problem can be solved by the seventh aspect of the present invention that is a female screw having a carbon fiber dispersed resin layer with threads formed on the inner surface of the female screw.

The third problem can be solved by the eighth aspect of the present invention that is a linearly moving block for moving on a guide rail, the inner surface of the linearly moving block being coated with a metal powder dispersed resin or a carbon fiber dispersed resin formed corresponding to the inner surface of the guide rail.

The third problem can be solved by the ninth aspect of the present invention that is a linearly moving block for moving on a guide rail, the inner surface of the linearly moving block being coated with a metal powder dispersed resin, a carbon fiber dispersed resin, or a composite material of which a heat hardening polyester resin is soaked in cotton cloth.

The third problem can be solved by the tenth aspect of the present invention that is a linearly moving block for moving on a guide rail, a metal powder dispersed resin or a carbon resin dispersed resin being coated on the inner surface of the linearly moving block, the resin being formed in a dot pattern.

The third problem can be solved by the eleventh aspect of the present invention that is a linearly moving block for moving on a guide rail, a metal powder dispersed resin or a carbon resin dispersed resin being coated on the inner surface of the linearly moving block, the resin being formed in a stripe pattern.

The third problem can be solved by the twelfth aspect of the present invention that is a guide rail for guiding a linearly moving block, the upper surface of the guide rail being coated with a metal powder dispersed resin, a carbon fiber resin dispersed resin, or a composite material of which a heat hardening polyester resin is soaked in cotton cloth.

The third problem can be solved by the fourteenth aspect of the present invention that is a guide rail for guiding a linearly moving block, a metal powder dispersed resin or a carbon fiber dispersed resin being coated on the upper surface of the guide rail in a dot pattern.

The third problem can be solved by the fourteenth aspect of the present invention that is a guide rail for guiding a linearly moving block, a metal powder dispersed resin or a carbon fiber dispersed resin being coated on the upper surface of the guide rail in a stripe pattern.

While the metal powder dispersed resin or the carbon fiber dispersed resin formed on the inner surface of the linearly moving block of the eighth to eleventh aspects contacts the upper surface of the guide rail, the linearly moving block moves along the guide rail.

While the metal powder dispersed resin or the carbon fiber dispersed resin formed on the upper surface of the guide rail of the twelfth to fourteenth aspects contacts the inner surface of the linearly moving block, the linearly moving block moves along the guide rail.

The fourth problem can be solved by the fifteenth aspect of the present invention that is a linearly moving block unit having a ball screw shaft rotatably pivoted and an angular nut that fits into the ball screw shaft, a female screw composed of a carbon fiber resin with threads being disposed at the center of the angular nut, a first ball rolling groove for a ball bearing or a cross roller bearing being formed in the angular nut, the first ball rolling groove extending in parallel with the female screw, a guide having a second ball rolling groove corresponding to the first ball rolling groove for the ball bearing or the cross roller bearing being disposed in parallel with the moving direction of the angular nut so that the first rolling groove is opposite to the second rolling groove.

BEST MODES FOR CARRYING OUT THE INVENTION

Next, with reference to the accompanying drawings, embodiments of the present invention will be described.

First Embodiment

Figure 1:
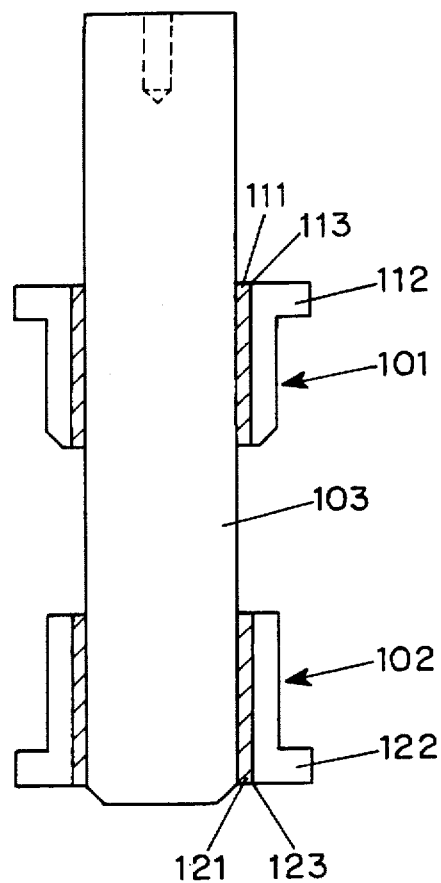
FIG. 1 is a partial longitudinal cross sectional view showing a sub-guide post, a stripper bush, and a die plate bush according to a first embodiment.

FIG. 1 is a partial longitudinal cross sectional view showing a sub-guide post, a stripper bush, and a die plate bush according to a first embodiment. A cylindrical rod shaped sub-guide post 103 passes through a cylindrical pipe shaped stripper bush 101. Likewise, the cylindrical rod shaped sub-guide post 103 passes through a cylindrical pipe shaped die plate bush. An outer member 112 of the cylindrical pipe shaped stripper bush 101 is composed of a tool steel or a stainless steel and precisely machined. A carbon fiber dispersed resin 111 that is machined in a cylindrical pipe shape is disposed inside the outer member 112 of the stripper bush 101. The carbon fiber dispersed resin 111 is securely adhered to the outer member 112 with an adhesive agent 113. Likewise, the inner surface of the die plate bush 102 is coated with a carbon fiber dispersed resin 121. An outer member 122 of the die plate bush 102 is composed of a metal. The outer member 122 is adhered to the carbon fiber dispersed resin 121 with an adhesive agent 123. In the first embodiment, the carbon fiber dispersed resin is polyacetal containing carbon fiber of 20% by weight. The content of the carbon fibers can be selected in the range from 10 to 30% by weight. Alternatively, another resin that has a low water absorbing ratio and a low thermal expansion ratio may be used instead of the carbon fiber dispersed resin.

Second Embodiment

Figure 2:
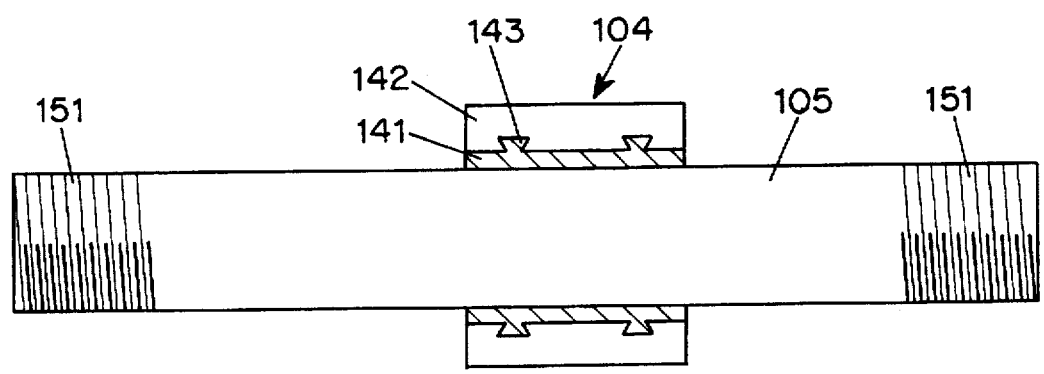
FIG. 2 is a partial longitudinal cross sectional view showing a cramp shaft and a bush according to a second embodiment.

FIG. 2 is a partial longitudinal cross sectional view showing a cramp shaft and a bush according to a second embodiment. An outer member 142 of a cylindrical pipe shaped bush 104 is formed in a pipe shape with a large inner diameter. Two peripheral grooves 143 are formed on the inner surface of the outer member 142. The area of each of the peripheral grooves 143 outwardly increases. The outer member 142 of the bush 104 is composed of a tool steel, a stainless steel, an aluminum alloy, or the like. Mold dies are disposed on the inner surface and side surfaces of the bush 104. A carbon fiber dispersed resin is filled in a space between the bush and the mold dies and inside the peripheral grooves 143. After the carbon fiber dispersed resin is pressured, it is cooled and solidified. Due to the anchor effect of the carbon fiber dispersed resin 141 in the peripheral grooves 143, the carbon fiber dispersed resin 141 is prevented from peeling off from the outer member 142. The cramp shaft 105 is formed in a cylindrical rod shape. At both edges of the clamp shaft 105, threads 151 are formed.

Third Embodiment

Figure 3:
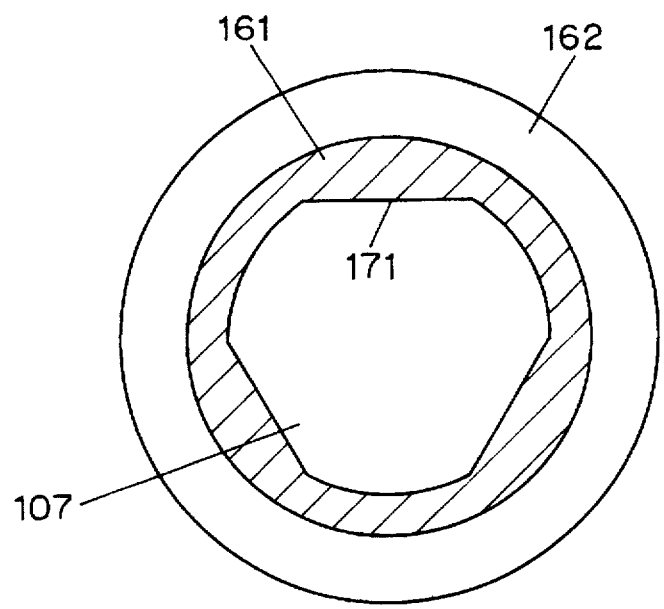
FIG. 3 is a lateral cross sectional view showing a guide post and a bush according to a third embodiment.

FIG. 3 is a lateral cross sectional view showing a guide post and a bush according to a third embodiment. The guide post 107 is formed in a nearly cylindrical rod shape. The guide post 107 has three planes 171 that extend in parallel with the center axis and that are formed at intervals of 120°. An outer member 162 of the bush is formed in a cylindrical pipe shape. A carbon fiber dispersed resin 161 that fits into the outer surface of the guide post 107 is disposed between the outer member 162 and the guide post 107. The carbon fiber dispersed resin 161 is adhered to the guide post 107 with an adhesive agent. Since the guide post 107 has the three planes, the bush is not rotated against the guide post 107. Thus, a linear motion of the bush is assured.

Fourth Embodiment

Figure 4:
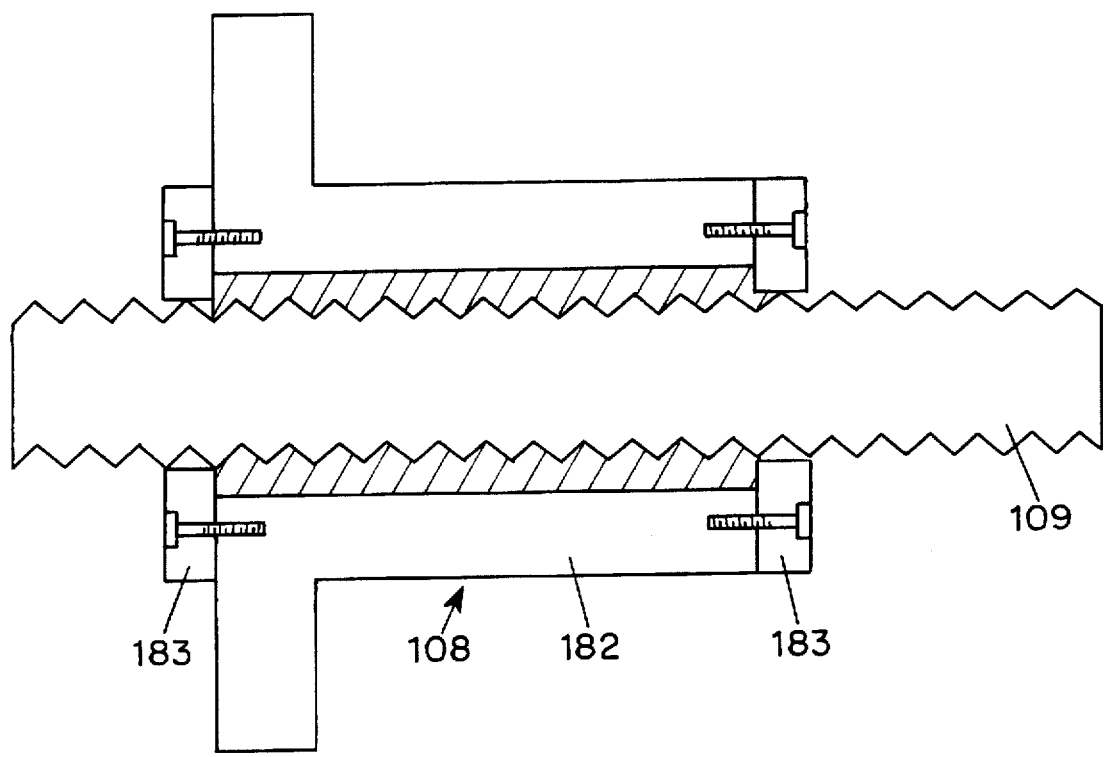
FIG. 4 is a longitudinal cross sectional view showing a spline nut and a spline shaft of a ball screw according to a fourth embodiment.

FIG. 4 is a longitudinal cross sectional view showing a spline nut and a spline shaft of a ball screw according to a fourth embodiment. The spline shaft 109 is composed of a cylindrical rod shaped material. Threads are formed on the surface of the spline shaft 109. When necessary, the threads on the spline shaft 109 may be of single-thread type or double-thread type. The spline shaft can be composed of a conventional SKS steel, ceramics, a WC-Co type, WC-Co-TiC type, or WC-Co-Ni type cemented carbide, or a carbon fiber dispersed resin. These materials are superior to the SKS steel in hardness, wearing resistance, specific gravity, and cost. The spline shaft 109 is disposed in such a manner that it can be forwardly and reversely rotated by for example a motor.

An outer member 182 of the spline nut 108 is shaped in a cylindrical pipe shape. The outer member 182 has a flange at one edge. The outer member 182 is composed of a metal material that is machined. A carbon fiber dispersed resin 181 is disposed in the outer member 183. Threads are formed on the inner surface of the carbon fiber dispersed resin 181. The carbon fiber dispersed resin 181 is securely adhered to the outer member 182 with an adhesive agent. As another fabricating method of the portion of the carbon fiber dispersed resin 181, a mold corresponding to the threads on the inner surface thereof is prepared. A heated carbon fiber dispersed resin is filled between the mold and the outer member. After the heated carbon fiber dispersed resin is pressured, it is cooled and solidified. When necessary, while the carbon fiber dispersed resin 181 is disposed inside the outer member 182, the threads of the carbon fiber dispersed resin 181 may be precisely formed by a cutting process or an abrading process. In this embodiment, disc shaped members 183 are secured to the left and right edges of the outer member 182 with machine screws.

Fifth Embodiment

Figure 5:
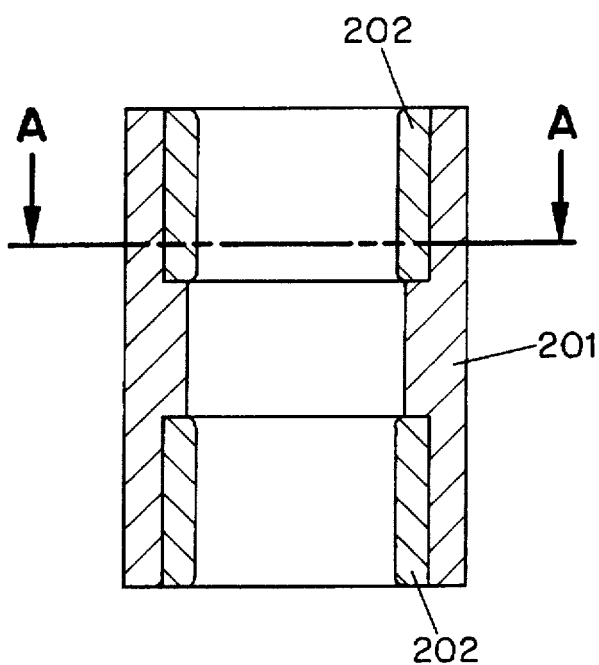
FIG. 5 is a longitudinal cross sectional view showing a bearing according to a fifth embodiment.
Figure 6:
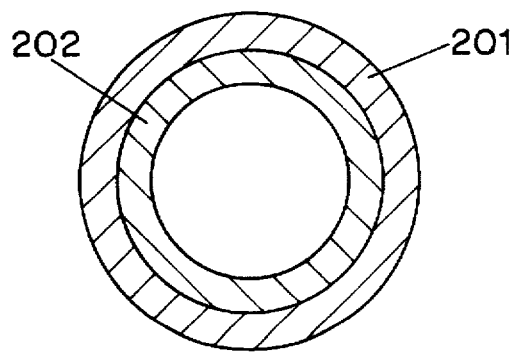
FIG. 6 is a lateral cross sectional view taken along line A—A of FIG. 5.
Figure 7:
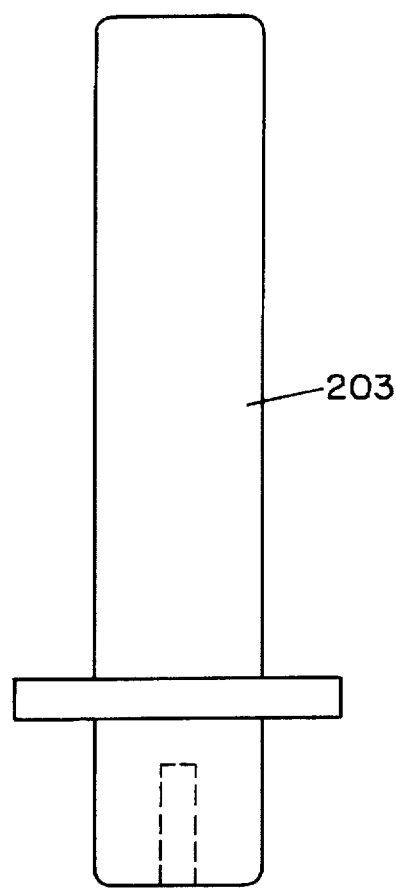
FIG. 7 is a longitudinal cross sectional view showing a cylindrical rod shaped guide member.

FIG. 5 is a longitudinal cross sectional view showing a bearing according to a fifth embodiment. FIG. 6 is a sectional view taken along line A—A of FIG. 5. A cylindrical pipe 201 that is composed of a metal and that has not been quenched is prepared. Inner surfaces of both edges of the cylindrical pipe 201 are cut for a predetermined length by a lathe or the like. Two carbon fiber dispersed resin cylindrical pipes (inserts) 202 that have been machined in a predetermined shape are disposed at an entrance portion and an exit portion of the cylindrical pipe 201. The inserts 202 are securely adhered to the cylindrical pipe 201 with a strong adhesive agent such as Locktight. In such a manner, the inserts 202 are disposed inside a bearing. The inner edge portions of the inserts 202 may be rounded as shown in FIG. 5. Alternatively, the inner edge portions of the inserts 202 may be tapered. Thus, a cylindrical rode shaped guide member 203 as shown in FIG. 7 comes in contact with only the inner surfaces of the inserts 202 composed of the carbon resin dispersed resin, rather than the metal surfaces of the bearing. Consequently, the guide member 203 can be prevented from getting baked. In addition, since there is a space at the center of the metal cylindrical pipe 201, the sliding portion can be prevented from adhering to dust.

Sixth Embodiment

Figure 8:
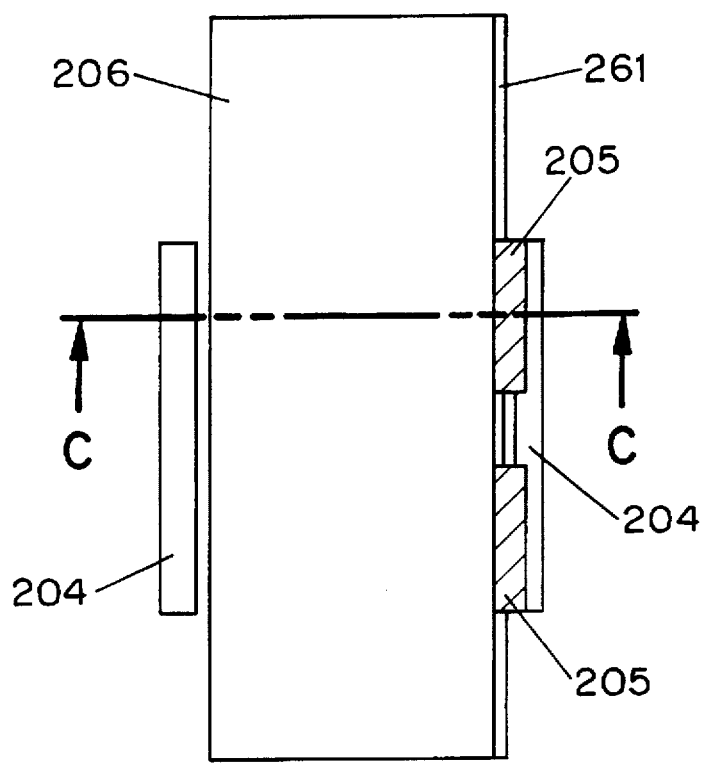
FIG. 8 is a longitudinal cross sectional view taken along line B—B of FIG. 9.
Figure 9:
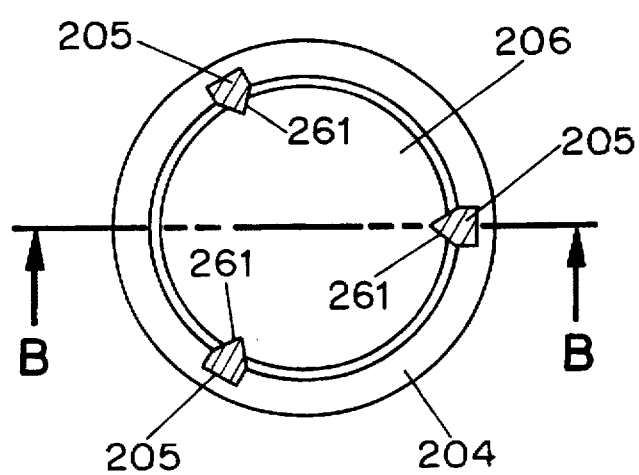
FIG. 9 is a lateral cross sectional view showing a bearing and a spline shaft according to a sixth embodiment.

FIG. 9 is a lateral cross sectional view showing a bearing and a spline shaft according to a sixth embodiment. FIG. 8 is a longitudinal cross sectional view taken along line B—B of FIG. 9.

The spline shaft 26 is formed in a nearly cylindrical rod shape. V-letter shaped grooves 261 are formed on the spline shaft 206. The V-letter shaped grooves 261 extend along the center axis of the spline shaft 206. The V-letter shaped grooves 261 may be formed at intervals of for example 60° or 90°. The bottoms of the V-letter shaped grooves are formed with sharp angles. When arc shaped relieves or square shaped relieves are formed, dust in the V-letter shaped grooves 261 can be easily removed. Thus, the spline shaft and the bearing can be prevented from being damaged. In the sixth embodiment, three V-letter shaped grooves 261 are formed at intervals of 120° around the center axis of the spline shaft 206.

The construction of the bearing is as follows. The bearing 204 is formed in a nearly cylindrical pipe shape. The inner diameter of the bearing 204 is larger than the outer diameter of the spline shaft 206. When the bearing 204 and the spline shaft 206 are assembled, a space takes place as shown in FIG. 9. Square shaped grooves with predetermined areas are formed in the inner surface of the bearing 204. The square shaped grooves extend in parallel with the center axis of the bearing 204. In other words, the square shaped grooves are formed for predetermined lengths at both the edges of the bearing 204. Thus, at the center of the inner surface of the bearing 204, the square shaped grooves are not formed. Resin pieces 205 composed of a carbon fiber dispersed resin are prepared. The resin pieces 205 are formed in a pentagon shape. The bottom portions of the resin pieces 205 are securely adhered to the respective grooves of the bearing 204. Thus, the resin pieces 205 protrude toward the center of the bearing 204.

When the spline shaft 206 is inserted into the bearing 204, the protrusions of the six resin pieces 205 that are adhered to the inner surface of the bearing 204 fit into the grooves 261 of the spline shaft 206. Thus, the spline shaft 206 is slid along the grooves 261. Consequently, the bearing 204 can be linearly moved with a guide of the spline shaft 206.

In the sixth embodiment, the resin pieces 205 are composed of a carbon fiber dispersed resin containing carbon fibers of 10 to 30% by weight that have been machined in the above-described shapes. When necessary, a silicon rubber may be used instead of the carbon fiber dispersed resin.

Seventh Embodiment

Figure 10:
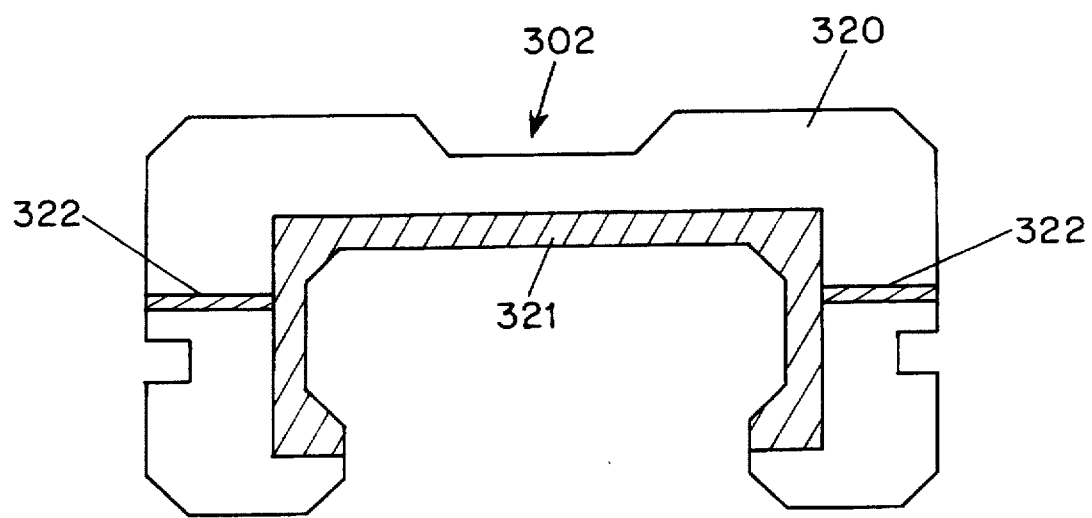
FIG. 10 is a lateral cross sectional view showing a linearly moving block according to a seventh embodiment.

FIG. 10 is a lateral cross sectional view showing a linearly moving block 302 according to a seventh embodiment. The linearly moving block 320 is formed in a "☐" shape. As with the related art reference, an outer portion 320 of the linearly moving block 302 is composed of a stainless steel. A carbon fiber dispersed resin 321 is disposed inside the outer portion 320. The carbon fibre dispersed resin 321 is formed corresponding to a guide rail by an injection molding process. The carbon fiber dispersed resin 321 is securely adhered to the outer metal portion 320. Through-holes 322 are formed at two or three positions of side walls of the outer metal portion 320 so as to allow air in the carbon fiber dispersed resin to escape in the injection molding process and thereby prevent bubbles from being formed in the carbon fiber dispersed resin. In the linearly moving block of the seventh embodiment, a ball bearing is not used. Since the guide rail surface contacts the carbon fiber dispersed resin on the inner surface of the linearly moving block, the rigidity of the linearly moving block is improved. Thus, a ball rolling groove for a ball bearing is not formed in the inner surface of the linearly moving block according to the seventh embodiment. When necessary, if a groove is formed in the portion of the carbon fiber dispersed resin, dust that is present between the linearly moving block and the guide rail can be removed from the groove.

Eighth Embodiment

Figure 11:
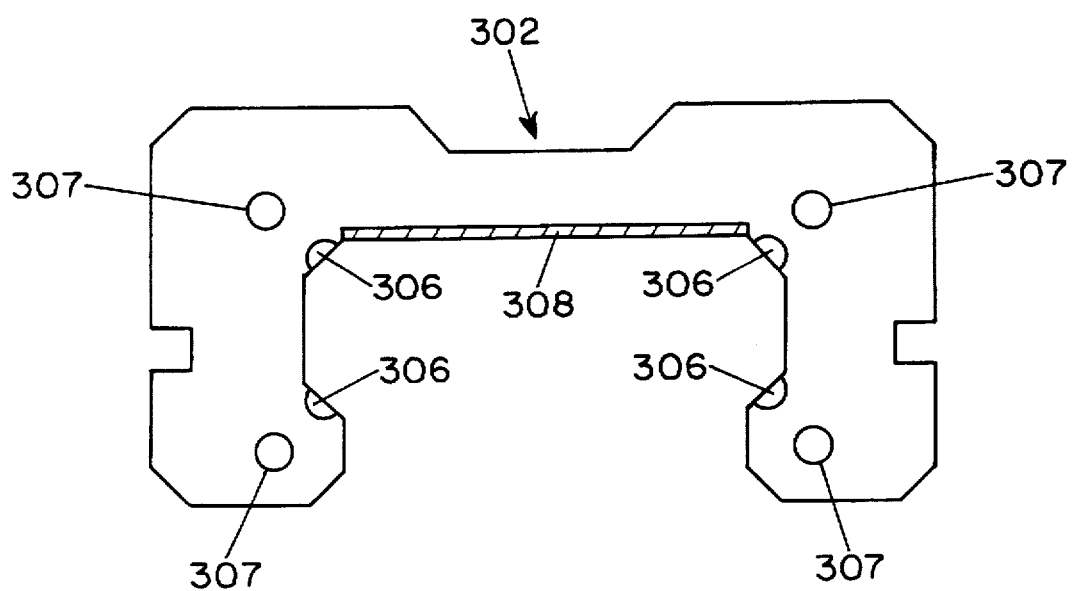
FIG. 11 is a lateral cross sectional view showing a linearly moving block according to an eighth embodiment.

FIG. 11 is a lateral cross sectional view showing a linearly moving block according to an eighth embodiment. The linearly moving block 302 according to the eighth embodiment is nearly the same as that shown in FIG. 10. In the linearly moving block 302 shown in FIG. 11, two ball rolling grooves 306 are formed in the inner surface of each of the left and right side plates. In addition, return paths 307 for circulating the balls of the ball bearings are formed in the vicinity of the ball bearing rotating grooves 306. The balls of the ball bearings are returned through the ball rolling grooves 306 and the return paths 307. A tape composed of a metal powder dispersed resin is adhered to an inner surface of the linearly moving block (namely, on a lower surface of a horizontal plate of the linearly moving block). Examples of the tape composed of the metal powder dispersed resin are "TARKAITO B" (trade name of CAPTAIN INDUSTRIES K.K.) and "TARKAITO B HP" (ditto). They are tapes of which brass powder is dispersed in a fluororesin. When the linearly moving block according to the eighth embodiment is used in combination with a conventional metal guide rail, the downward load resistance of the linearly moving block is improved. The linearly moving block can be smoothly moved. The linearly moving block has a high wearing resistance. The stick slip phenomenon that tends to take place in the initial motion of the linearly moving block can be alleviated. Thus, the linearly moving block has high attenuating characteristic, high vibrating characteristic, and high vibration absorbing characteristic. Instead of using the tape composed of metal powder dispersed resin, a fluid of which brass powder is dispersed to an acetal type resin is injection molded, solidified, and securely adhered to the metal portion. At this point, holes or grooves may be formed in the metal portion. The resin may be filled therein and then solidified so as to cause the metal powder dispersed resin to be securely adhered to the metal portion for the anchor effect.

In the eighth embodiment, since the grooves of the guide rail contact the ball rolling grooves of the linearly moving block through the ball bearing, the linearly moving block can smoothly and linearly moved. In addition, since the metal powder dispersed resin layer on the inner surface of the linearly moving block contacts the upper surface of the guide rail, the downward load applied to the linearly moving block can be supported. Thus, the linearly moving block can be smoothly moved.

Ninth Embodiment

In a ninth embodiment, a metal powder dispersed resin is formed in a disc shape. A plurality of disc shaped metal powder dispersed resin portions are formed in a lattice shape or a zigzag shape. In consideration of the downward load and rigidity of the linearly moving block, the surface area of the metal powder dispersed resin is designed and the size and density of the disc portions are determined. In the ninth embodiment, since the metal powder dispersed resin portion is formed at predetermined pitches, the linearly moving block has load resistance, lubricating characteristic, and dust removing characteristic.

Tenth Embodiment

Figure 12:
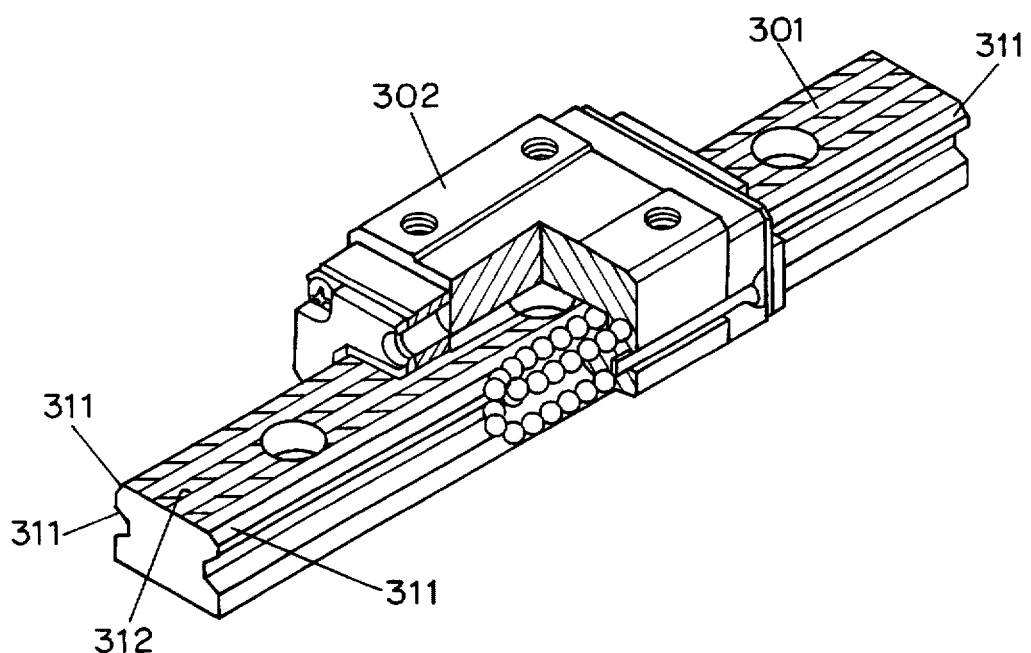
FIG. 12 is a perspective view showing a guide rail according to a tenth embodiment.

FIG. 12 is a perspective view showing a guide rail according to a tenth embodiment. Two R grooves are formed in each of side surfaces of the guide rail 301. A carbon fiber dispersed resin 312 is formed on the upper surface of the guide rail 301 in a stripe pattern. Holes 313 are formed in the guide rail 301 at predetermined intervals. The holes 313 pierce from the upper surface of the guide rail 301 to the lower surface thereof. The guide rail is secured on a pedestal with machine screws.

Eleventh Embodiment

Figure 13:
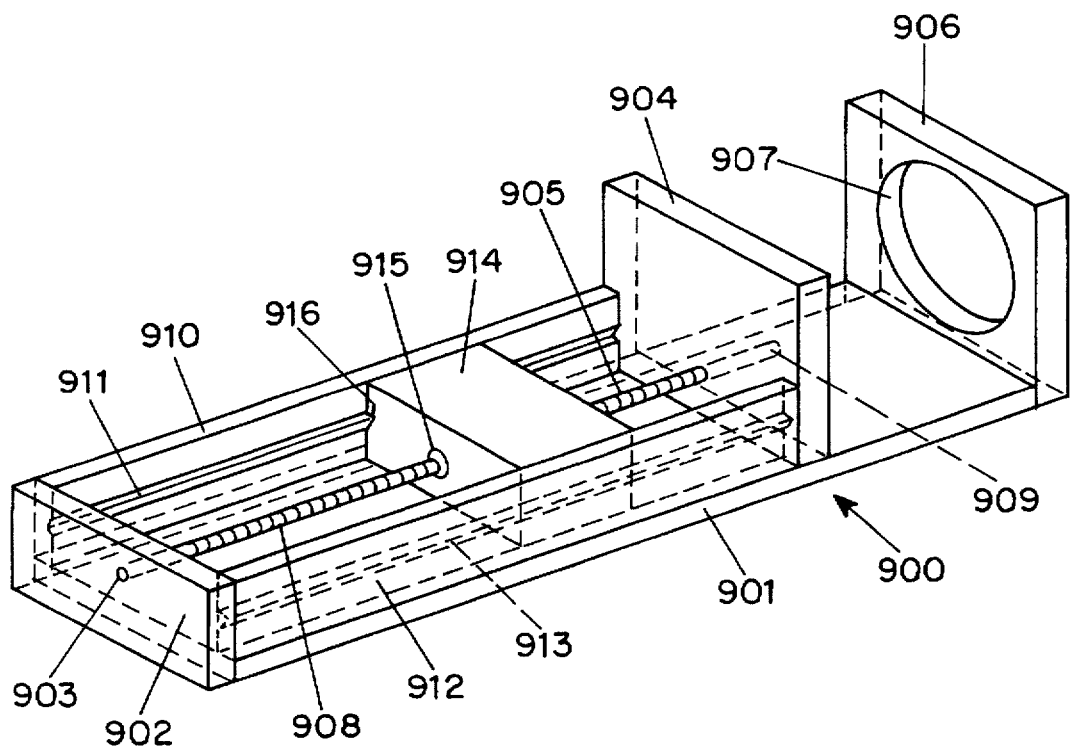
FIG. 13 is a perspective view showing a linearly moving block unit according to an eleventh embodiment.
Figure 14:
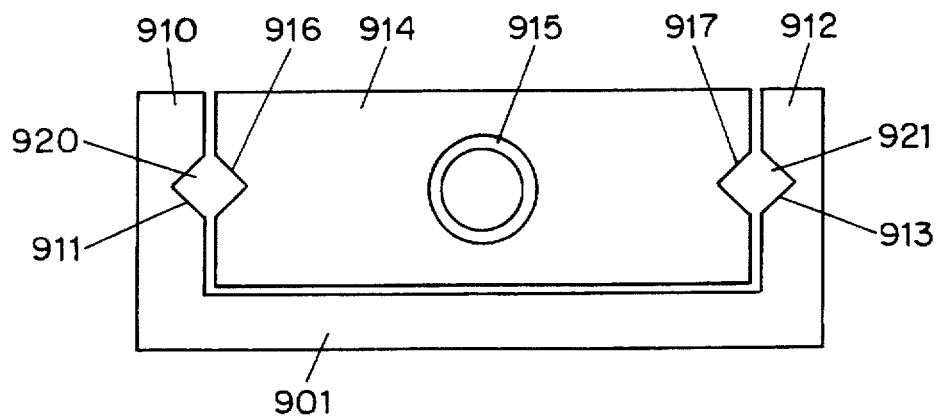
FIG. 14 is a lateral cross sectional view showing the linearly moving block unit according to the eleventh embodiment.

FIG. 13 is a perspective view showing a linearly moving block unit according to an eleventh embodiment. The linearly moving block 900 according to the eleventh embodiment comprises a base plate 901, a shaft support plate 902, a shaft support plate 904, a ball screw shaft 908, an angular nut 914, and guide plates 910 and 912. The bearing support plate 902 is disposed at the left edge of the base plate 901 in such a manner that the bearing support plate 902 is perpendicular to the base plate 901. The shaft support plate 904 is disposed in the middle of the base plate 901 in such a manner that the shaft support plate 904 is perpendicular to the base plate 901. The ball screw shaft 908 is rotatably pivoted by a bearing 903 of the shaft support plate 902 and a bearing 905 of the shaft support plat 904. The angular nut 914 is fitted into the ball screw shaft 908. The guide plates 910 and 912 are disposed on the rear and front surfaces of the unit in such a manner that the guide plates 910 and 912 extend in parallel with the ball screw shaft 908. A motor mounting plate 906 that mounts a pulse motor or a stepping motor is disposed on the right edge of the base plate 901. A circular hole 907 is formed at the center of the motor mounting plate 906. The motor is disposed through the circular hole 907. A connecting terminal 909 of the ball screw shaft and a drive shaft of the motor (not shown) are connected directly or indirectly through a gear. When the ball screw shaft 908 is forwardly or reversely rotated, the angular nut 914 is moved leftward or rightward, respectively. A female screw 915 of the angular nut 914 is composed of a cylindrical pipe shaped carbon fiber dispersed resin. Threads are formed on an inner surface of the carbon resin dispersed resin. The female screw 915 is disposed in the center hole of the angular nut 914. The female screw 915 is securely adhered to the angular nut 914 with an adhesive agent or the like. V-letter shaped grooves 916 are formed at center positions of side surfaces of the angular nut 914. The V-letter shaped grooves 916 extend in parallel with the ball screw shaft 908. Likewise, V-letter shaped grooves 911 and 913 are formed at center portions on the inner surfaces of the guide plates 910 and 912, respectively. The V-letter shaped grooves 911 and 913 extend in parallel with the ball screw shaft 908. The V-letter shaped grooves 916 are referred to as first moving grooves. The V-letter shaped grooves 911 and 913 are referred to as second moving grooves. As shown in FIG. 14, cross roller bearing holders 920 and 921 having cross roller bearings are rotatably disposed between the V-letter shaped groove 916 and the V-letter shaped groove 911 and between the V-letter shaped groove 917 and the V-letter shaped groove 913, respectively. Thus, the angular nut 914 can be smoothly slid along the guide plates 910 and 912 through the cross roller bearing almost free of a play.

Twelfth Embodiment

Figure 15:
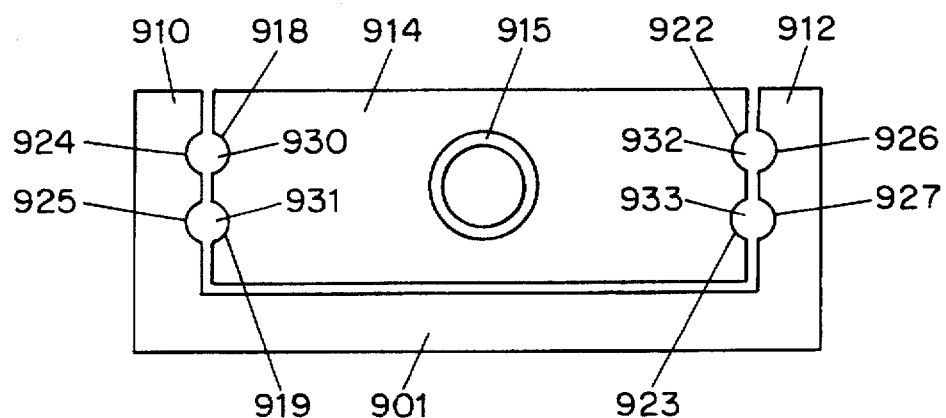
FIG. 15 is a lateral cross sectional view showing a linearly moving block unit according to a twelfth embodiment.

FIG. 15 is a sectional view showing a linearly moving block unit according to a twelfth embodiment. As with the eleventh embodiment, a female screw 915 composed of a cylindrical tube shaped carbon fiber dispersed resin is disposed on an inner surface of an angular nut 914. Threads are formed on the inner surface of the carbon fiber dispersed resin. The female screw 915 is adhered to the angular nut 914. However, in the twelfth embodiment, R grooves 918, 919, 922, and 923 that allow balls of ball bearings to rotate are formed on side surfaces of the angular nut 914. The R grooves 918, 919, 922, and 923 extend in parallel with the shaft of the ball screw. R grooves 924, 925, 926, and 927 are formed in the guide plates 910 and 912 corresponding to the R grooves 918, 919, 922, and 923, respectively. Ball bearings 930, 931, 932, and 932 of the ball bearing holders are disposed in the cylindrical rod shaped spaces formed by the R grooves. Thus, the angular nut 914 can be smoothly slid along the guide plates 910 and 912 free of a play.

Thirteenth Embodiment

Figure 16:
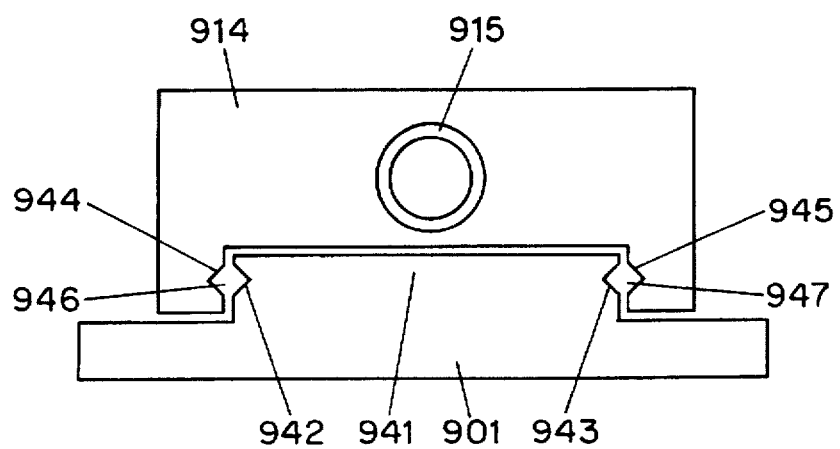
FIG. 16 is a lateral cross sectional view showing the linearly moving block unit according to the twelfth embodiment.

FIG. 16 is a lateral cross sectional view showing a linearly moving block unit according to a thirteenth embodiment. A female screw 915 shown in FIG. 16 is the same as those shown in FIGS. 11 and 12. However, in the thirteenth embodiment, an angular nut 914 has a square gutter shaped portion. V-letter shaped grooves 944 and 945 are formed at center portions on the inner surfaces of the left and right side surfaces. The V-letter shaped grooves 944 and 945 extend in parallel with the ball screw shaft 915. In the thirteenth embodiment, a guide plate is not disposed. A base plate 901 has a center staged protrusion portion 941. The protrusion portion 941 fits into the square gutter shaped portion. V-letter shaped grooves 942 and 943 are formed in side surfaces of the protrusion portion 941 of the base plate. Cross roller bearings 946 and 947 of cross roller bearing holders are disposed in square prism shaped spaces formed by the V-letter shaped grooves 942 and 943.

INDUSTRIAL UTILIZATION

The bearing of the present invention has a high wearing resistance against sliding with the guide member. Thus, the bearing can be operated for a long time without necessity of lubrication. Thus, the bearing can be used in an oil-free clean environment such as fabrication process and inspection process of semiconductors, precise machines, ultra high vacuum experimental facilities, medical sites, and so forth. In addition, the thermal expansion of the bearing according to the present invention is small. Moreover, since the bearing has a high heat resistance, it can be stably operated for a long time. Furthermore, since the bearing is relatively low, the cost of the final product can be reduced.

Since the outer member of the bearing according to the present invention uses a conventional material, the bearing can be mounted to a machine element in a conventional manner.

The female screw according to the present invention has a high wearing resistance. Thus, the female screw can be continuously used without necessity of lubrication. In addition, the female screw is relatively inexpensive.

In the present invention, since a carbon fiber dispersed resin, a metal powder dispersed resin, or a composite material of which a heat hardening polyester resin is soaked in cotton cloth is disposed between the inner surface of the linearly moving block and the upper surface of the guide rail, (1) the downward load resistance is improved, (2) the attenuating and shock absorbing characteristics are improved, and (3) the linear motion is smoothly performed.

I claim:

1. A linearly moving block unit comprising:

a screw shaft having an external thread;

a linear guide rail disposed in parallel with said screw shaft, said guide rail including two side walls, each side wall having an inner surface and a recessed guide groove formed in said inner surface in parallel with said screw shaft;

an angular nut including a center hole and two side surfaces, each side surface including a recessed nut groove disposed in parallel with said screw shaft and said center hole having a female screw disposed therein, said female screw being composed of a carbon fiber resin and having an internal thread formed to directly receive and engage said external thread of said screw shaft;

said screw shaft extending through said center hole of said angular nut with said external and internal threads being in direct engagement;

said angular nut being moveably fitted into said linear guide such that said recessed nut grooves oppose said respective recessed guide grooves to form respective roller beating holders; and roller beatings rotatably disposed in each of said respective roller beating holders so that said angular nut is smoothly slid along said linear guide when said screw shaft is rotated, wherein the rotation of said screw shaft is directly transmitted to said angular nut.

* * * * *